Aug. 25, 1970     C. W. LOFTIN     3,525,563
REARVIEW MIRROR
Filed Aug. 1, 1968
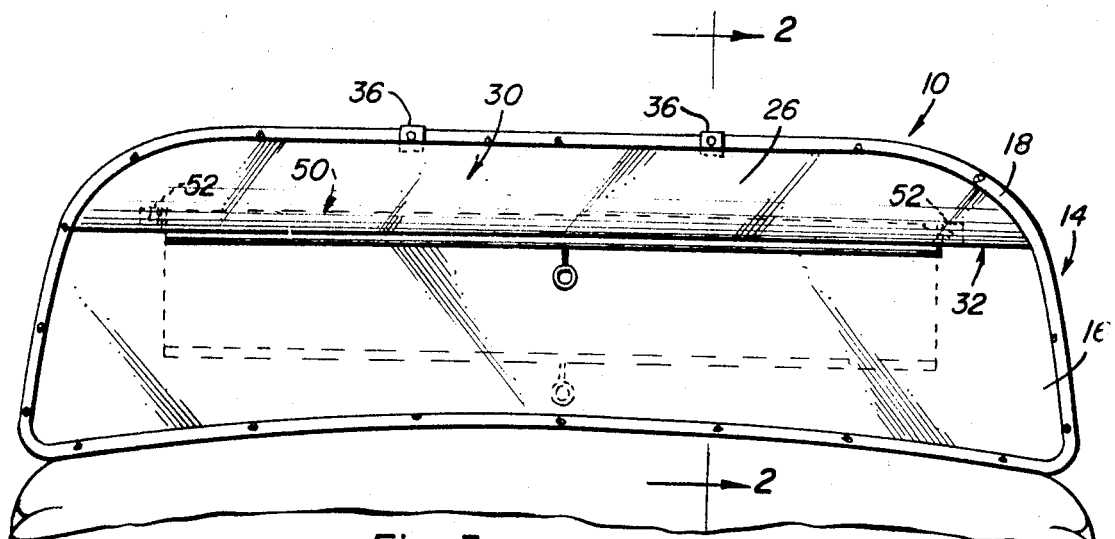
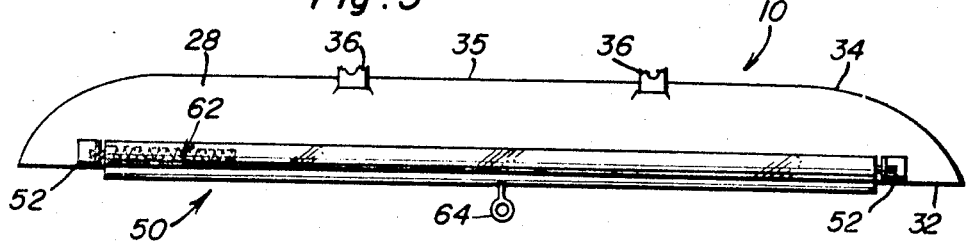
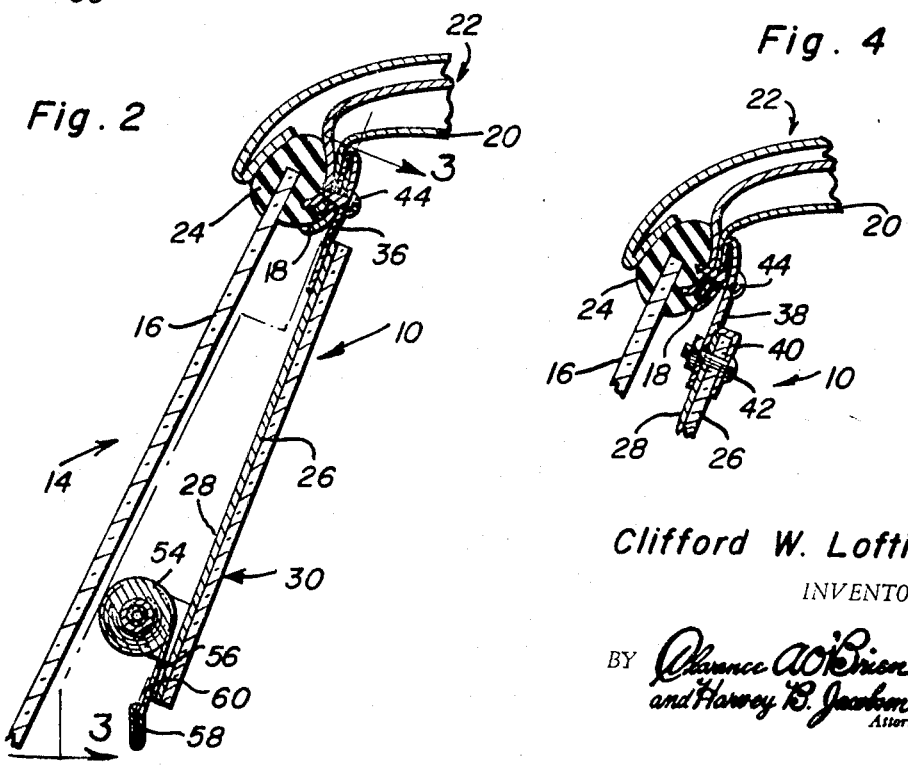
Clifford W. Loftin
*INVENTOR.*
BY *Clarence A.O'Brien*
*and Harvey B. Jacobson*
                      *Attorneys*

3,525,563
REARVIEW MIRROR
Clifford W. Loftin, 300 W. 8th St.,
Claremont, Calif. 91711
Filed Aug. 1, 1968, Ser. No. 749,542
Int. Cl. B60j 3/00; B60r 1/12
U.S. Cl. 350—277                                5 Claims

ABSTRACT OF THE DISCLOSURE

A rearview mirror-sun visor assembly comprising a generally rectangular elongated self-sustained rigid mirror including a straight longitudinal lower edge and an upper curved longitudinal edge conforming to the curvature of the inner upper molding of the windshield assembly with which the rearview mirror-sun visor is associated. The mirror extends across substantially the entire width of the upper portion of the windshield assembly of the vehicle and the non-reflecting surface of the mirror carries a spring controlled shade roller having a downwardly extensible flexible sun visor wound thereon. The rearview mirror-sun visor assembly is secured to the windshield assembly of the vehicle by a fastener means including fastener members passing through apertures provided in the mirror.

---

The present invention relates generally to rearview mirror-sun visor assembly for automotive vehicles and more particularly to a rearview mirror-sun visor assembly extending substantially the entire transverse width of the windshield of such vehicles and including a spring controlled roller mounted, sun visor.

It is an object of the present invention to provide a novel construction for a rearview mirror-sun visor assembly which provides the maximum degree of rear vision possible in the particular vehicle with which the mirror is operatively associated.

Another object of the present invention is to provide a self-sustaining rigid rear view mirror, of plate glass, which extends across substantially the entire width of the upper portion of the windshield assembly of a vehicle with which the mirror is associated and wherein the upper longitudinal edge of the mirror conforms to the curvature of the inner upper molding of the windshield assembly.

Still another object of the present invention is to provide a rearview mirror assembly of the aforementioned construction including a spring controlled shade roller mounted on the non-reflecting surface of the mirror and having wound thereon an opaque or translucent flexible sun visor formed of sheet material.

Still another object of the present invention is to provide a novel rearview mirror-sun visor assembly of the aforementioned construction wherein the assembly is secured to the inner upper molding of the windshield assembly by a tab extending upwardly therefrom and having one end portion secured to the mirror by fasteners passing through apertures provided in the mirror adjacent the upper portion thereof.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a front elevational view of an exemplary embodiment of a rearview mirror-sun visor assembly constructed in accordance with the present invention and operatively positioned with respect to the windshield assembly of a vehicle;

FIG. 2 is an enlarged vertical cross-sectional view, taken along the plane of the line 2—2 of FIG. 1, showing additional details of the construction including the means for mounting the rearview mirror-sun visor assembly of FIG. 1;

FIG. 3 is a rear elevational view, in somewhat reduced scale, of the rearview mirror-sun visor assembly of FIG. 2 taken along the plane of the line 3—3 of FIG. 2; and FIG. 4 is a fragmentary vertical cross-sectional view, somewhat similar to a portion of FIG. 2, illustrating another embodiment of the means for securing the rearview mirror-sun visor assembly to the inner upper molding of the windshield assembly of the vehicle with which it is associated.

Referring now to the drawings in greater detail, and FIG. 1 in particular, it will be seen that an exemplary form of a rearview mirror-sun visor assembly constructed in accordance with the present invention is indicated generally at 10 and shown mounted in its normal position relative to a windshield assembly 14 comprising a portion of an automotive vehicle. The assembly 14, of conventional construction, includes a windshield 16 and a peripheral inner molding 18 conventionally utilized to fasten and decoratively complete the attachment of a headliner 20 to the portion indicated at 22 of the vehicle roof which defines a mounting channel for the reception of the windshield 16 protected by a resilient peripheral cushioning bead 24.

The rearview mirror-sun visor assembly 10 includes a generally rectangular elongated mirror 26, preferably formed of plate glass and silvered as at 28, in a conventional manner, whereby there is provided a reflecting surface generally indicated by the numeral 30 although it will, of course be appreciated that the "reflecting surface" per se is defined by the plane comprising the juncture between the silver 28 and the contiguous surface of the glass 26. Hereinafter the silvered side 28 of the mirror 26 is referred to as the non-reflecting surface thereof. As seen best in FIGS. 1 and 3 the mirror 26 is further characterized by a straight lower longitudinal edge 32 and an arcuate "upper" longitudinal edge 34 which curves downwardly at the ends thereof to meet the lower longitudinal edge 32. The upper edge 34 may be straight along an intermediate portion 35 thereof. However, it will be understood that the criterion for the degree of curvature of the edge 34 is that it correspond to the curvature of the upper portion of the windshield assembly molding 18 thus providing a mirror 26 which extends across substantially the entire width of the upper portion of a windshield assembly, such as the assembly 14, with which the rearview mirror-sun visor assembly 10 is associated.

The mirror-sun visor assembly 10 is secured to the inner upper portion of the windshield molding 18 by means of tabs 36 having their lower ends secured to the upper portion of the mirror 26. In the tab means 36 illustrated in FIG. 2 it will be seen that the lower portion of the tab 36 is secured to the non-reflecting surface of the mirror 26, such as by a conventional epoxy adhesive, for example, although it will be appreciated that any suitable adhesive may be utilized keeping in mind that the adhesive should not adversely affect the silvering 28.

In the embodiment of FIG. 4 it will be seen that the tab means for securing the mirror 26 to the molding 18 comprises a tab means 38 having a bifurcated lower end portion 40 and secured about the upper surface and edge portion of the mirror 26 by a through bolt 42 passing through suitable apertures provided in the bifurcated portion 40 of the tab 38 and the mirror 26 as well as the silvering 28. In the embodiments of FIGS. 2 and 4 the upper portion of the tabs 36 and 38 respectively are bent back upon itself so as to normally be retained between the molding 18 and the portion 22 of the body defining the mounting groove for the windshield 16 and wherein the tabs 36 and 38 are retained by a suitable sheet metal screw, or the like 44 thereby completing the mounting of the rearview mirror-sun visor.

The rearview mirror-sun visor assembly 10 further includes a spring controlled shade roller mounted flexible sun visor indicated generally at 50 secured to the non-reflecting surface of the mirror 26 by a pair of suitable brackets 52 which rotatably mount a shade roller 54 for rotation about a longitudinal axis parallel to the straight lower edge 32 of the mirror 26. Wound about the shade roller 54, for selective withdrawal downwardly beneath the lower edge 32 of the mirror 26 is a flexible sheet 56 of opaque translucent, or tinted material which comprises the sun visor. The lower edge of the visor is weighted and rigidified by a transversely extending bar 58 held captive within a lower portion of the sheet 56 which is bent back upon itself and fastened in a suitable manner as at 60. For convenience of unwinding and rewinding of the sun visor sheet 56, under the influence of a spring means indicated generally at 62 within the roller 54, the bar 58 is provided with a pull ring 64.

From the foregoing it will be readily apparent that the rearview mirror-sun visor assembly 10 provides a practical means of providing an automotive vehicle with the maximum rear vision on the part of the operator of the vehicle while at the same time incorporating a sun visor which does not normally, when in the non-use position, interfere with the degree of rear vision obtained from the reflective surface 30.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a vehicle provided with a windshield assembly including an upper marginal portion, a rearview mirror-sun visor assembly comprising a generally rectangular elongated self-sustaining rigid mirror having reflecting and non-reflecting sides and generally parallely disposed upper and lower longitudinal edges, mounting means securing said mirror assembly within said vehicle with said mirror extending across substantially the entire width of the upper marginal portion of said windshield assembly, said lower longitudinal edge of said mirror being generally straight, said upper longitudinal edge of said mirror curving arcuately downwardly at the ends of said mirror, the curvature of said upper longitudinal edge conforming to the curvature of the juxtaposed upper marginal portion of said windshield assembly, a spring controlled shade roller mounted on the non-reflecting side of said mirror with the longitudinal axis of said shade roller parallel to said lower longitudinal straight edge of said mirror, and a flexible sun visor wound on said shade roller for selective downward extension beneath said mirror.

2. The combination of claim 1 wherein said mounting means comprises at least one tab having one end portion secured to said mirror by at least one fastener passing through an aperture in said mirror and a second end portion fastened directly to said vehicle at upper marginal portion of said windshield assembly.

3. The combination of claim 2 wherein said one end portion of said tab secured to said mirror is contiguous with the non-reflecting side of said mirror.

4. The combination of claim 2 wherein said one end portion of said tab secured to said mirror is bifurcated and contiguous with the non-reflecting and reflecting sides of said mirror.

5. The combination of claim 1 wherein said mirror is formed of silvered plate glass.

References Cited

UNITED STATES PATENTS 1,518,956  12/1924  Beitman _____ 350—277
3,411,841  11/1968  Loftin _____ 296—97 X LEO FRIAGLIA, Primary Examiner J. A. PEKAR, Assistant Examiner U.S. Cl. X.R.

296—97